United States Patent [19]

Christy

[11] Patent Number: 4,718,770
[45] Date of Patent: Jan. 12, 1988

[54] EXTRUDER FOR ELASTOMERIC MATERIAL

[75] Inventor: Raymond L. Christy, Akron, Ohio

[73] Assignee: NRM Corporation, Columbiana, Ohio

[21] Appl. No.: 863,887

[22] Filed: May 16, 1986

[51] Int. Cl.$^4$ .............................................. B29B 7/60
[52] U.S. Cl. ................................... 366/71; 264/349; 366/76; 425/145; 425/186; 425/194; 425/447
[58] Field of Search ............... 100/168, 170, 173, 176; 264/175, 349; 366/71, 72, 73, 76; 425/113, 145, 148, 182, 186, 189, 194, 201, 204, 205, 225, 230, 237, 328, 329, 331, 335, 341, 367, 447, 449, 190

[56] References Cited

U.S. PATENT DOCUMENTS

| | | | |
|---|---|---|---|
| 1,930,873 | 10/1933 | Brewster | 366/73 |
| 2,054,114 | 9/1936 | Abrams et al. | 264/175 |
| 2,484,670 | 10/1949 | Barker | 425/194 |
| 4,247,272 | 1/1981 | Anders | 425/204 |
| 4,286,882 | 9/1981 | Schiesser | 366/76 |
| 4,408,974 | 10/1983 | Comerio | 425/194 |

FOREIGN PATENT DOCUMENTS 487638 6/1938 United Kingdom .................. 366/76

*Primary Examiner*—Jay H. Woo
*Assistant Examiner*—J. Fortenberry
*Attorney, Agent, or Firm*—Renner, Otto, Boisselle & Lyon

[57] ABSTRACT

A screw extruder of the elastomeric material type includes a feed section with a power driven feed roll in a feed box running adjacent and counter the rotation of the screw. The roll is journaled for rotation on a frame which may easily be moved to and from an operative and an open position to facilitate service or cleaning. A quick release mechanism secures and releases the feed roll in the operative position. The roll frame is mounted for easy movement on horizontally extending guide rods which may extend and be journaled for sliding movement over or under the feed section. The feed box includes an insert which is adjustable and incorporates roll end lip seals and also a separately adjustable roll face scraper or seal thereby to reduce clearances as wear occurs without disturbing the proper relationship of such seals. The roll and insert may readily be replaced so that the roll size and relationship to the screw may be changed without changing the main body of the feed section or the alignment of the extruder. The feed roll is preferably driven by a hydraulic motor driven from a variable displacement pump with a load sensing control so that the pump delivers the flow at the pressure required by the load in the feed box, thus speeding up or slowing down as required and eliminating the need for a feed box sensor while nonetheless properly and uniformly filling the feed screw.

31 Claims, 10 Drawing Figures

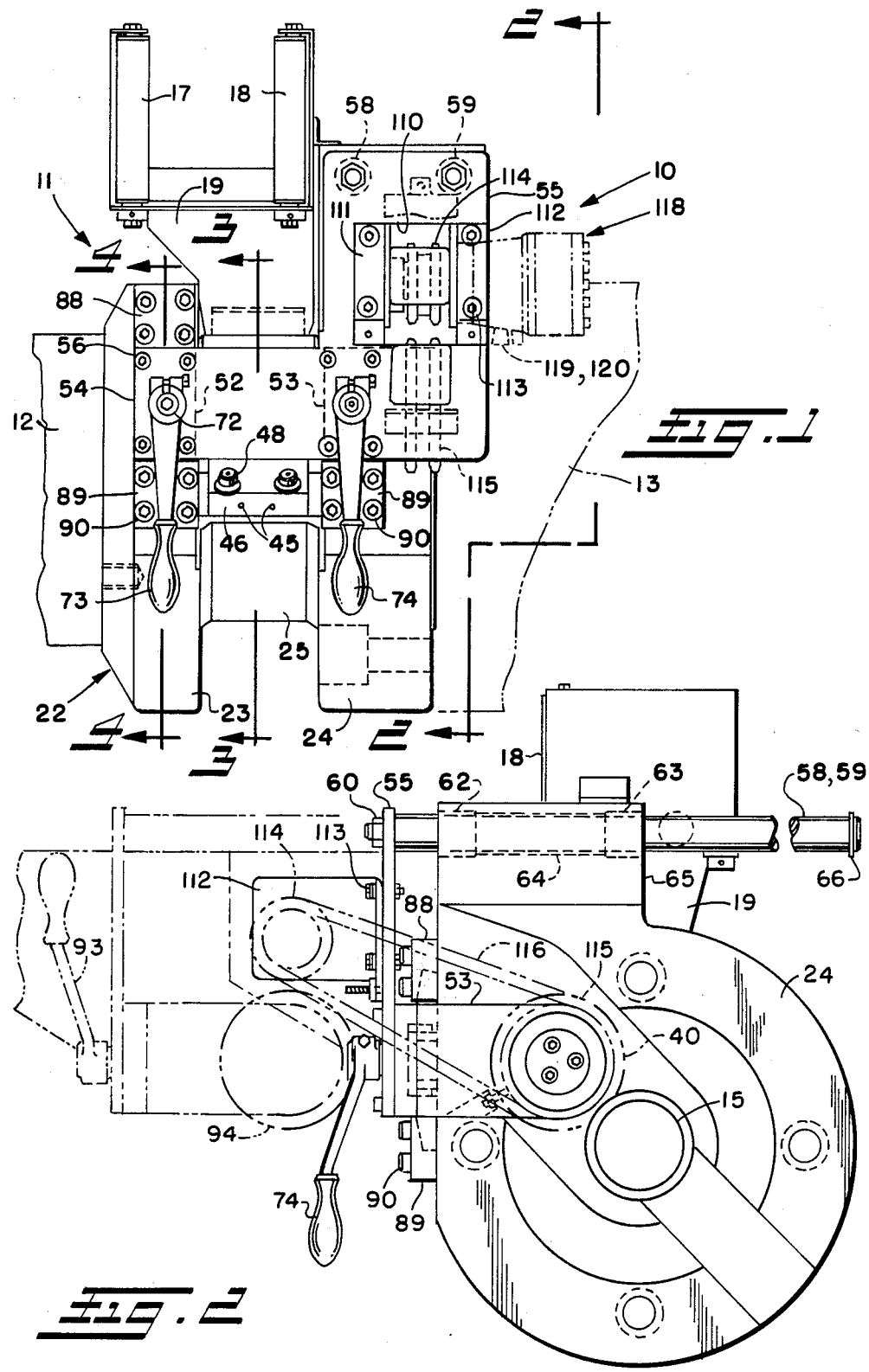

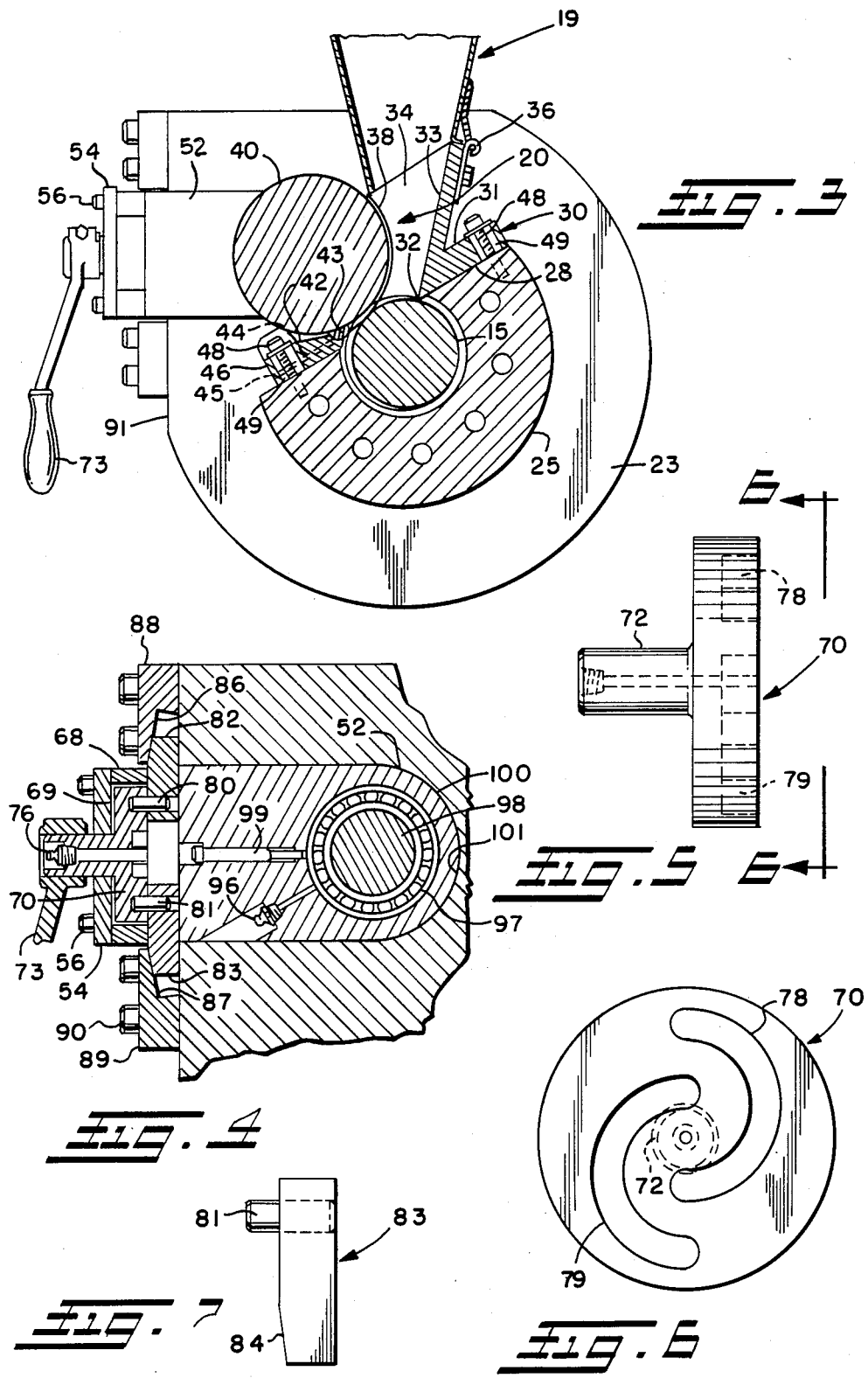

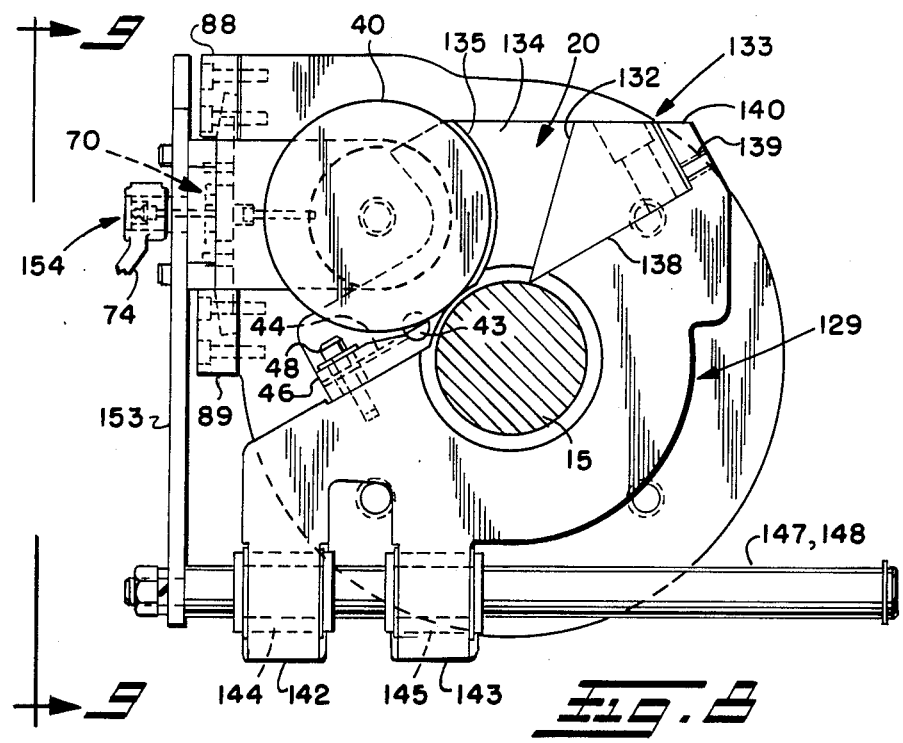
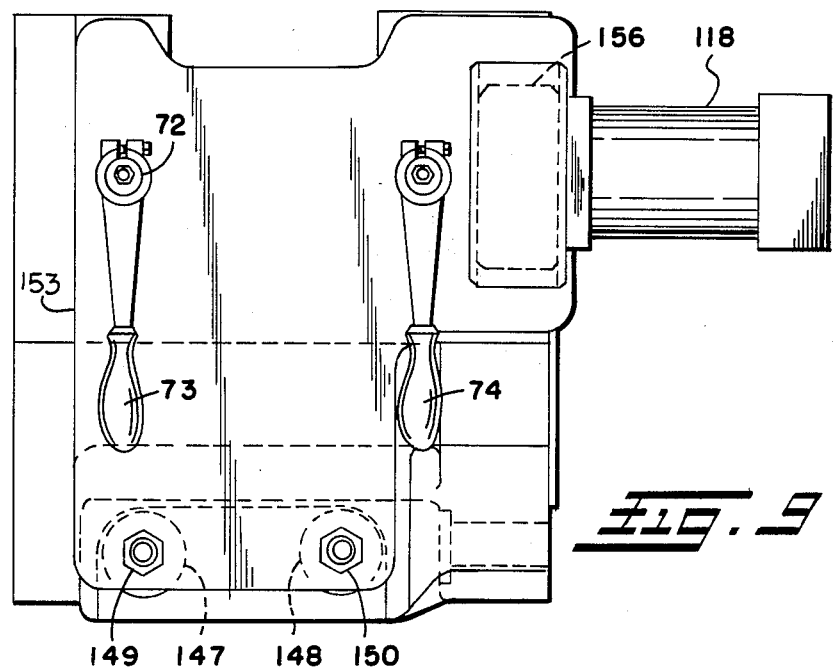

EXTRUDER FOR ELASTOMERIC MATERIAL

DISCLOSURE

This invention relates generally as indicated to an extruder for elastomeric materials and more particularly to a rubber or elastomeric material extruder incorporating certain improvements in the feeding of material to the extruder.

BACKGROUND OF THE INVENTION

Elastomeric material extruders are widely used for forming shapes, profiles, tubes, treadstock, or the like. The feed stock is usually fed in strip form to a feed box which may be in part formed by a feed roll. From the feed box the strip is fed to the feed section of the screw to pass through the extruder and exit the die. Because of the presence of cured fines or foreign objects, or feed stock getting into bearings or other areas in the feed box, or compound changes, the feed box must be opened periodically for cleaning or servicing. This might usually entail shutting down the process, removal of the feed roll, cleaning the roll and box, and then replacement, perhaps readjustment, and restarting the process. The more quickly and readily this can be accomplished the better.

Also, if the feed box were designed to prevent feed stock intrusion into areas where it should not be, fewer clean outs would be required. Also, if the feed box contains readily adjustable roll seals, less intrusion, wear replacement and roll adjustment would be required. Moreover, the construction of the feed roll and box should enable size changes without removing the entire feed section or requiring realignment of the extruder.

Uniform feed is also an important consideration in that the lack thereof may not only result in such feed stock intrusion, but also create the possibility of starving, regurgitation or feed strip breakage, thus affecting the uniformity of the process and requiring more operator attention, downtime and maintenance. Where power driven feed rolls are employed, or other devices used to try to control uniformity of feed, the feed box or extruder may contain one or more sensors. However, such sensors oftentimes create a point of malfunction, or if of the tactile type, can be damaged or even swallowed by the extruder. Accordingly an extruder feed box which can provide uniform feed without sensors is desirable.

SUMMARY OF THE INVENTION

The screw extruder of the present invention incorporates a feed section which includes a feed box formed on one side by a power driven roll running adjacent and counter the rotation of the screw, and on the opposite side by a feed box insert which is mounted on an inclined surface in the feed section. The feed box insert is adjustably mounted on the inclined surface and includes roll end lip seals and also a separately adjustable roll face scraper or seal running against the feed roll just after its surface passes its point of adjacency to the screw. In this manner, positional adjustment both of the lip seals and face seals may readily be obtained to compensate for wear. The seals prevent the feed stock material from introducing into areas around the feed roll, such as bearings, gears and transmission seals.

The feed roll is journaled for rotation on a frame which may easily be moved to and from an operative and an open position to facilitate service and cleaning. A quick release mechanism secures and releases the feed roll in the operative position. A frame supporting the roll is mounted for easy movement on horizontally extending guide rods which may extend and be journaled for sliding movement over or under the feed section. If the guide rods extend over the feed section they may be laterally offset from the feed box.

In either form, the roll and insert may be replaced so that the roll size and relationship to the screw may be changed without changing the main body of the feed section or the alignment of the extruder. Also, in either form the feed roll is preferably driven by a hydraulic motor mounted on the movable frame, such motor being driven from a variable displacement pump with a load sensing control so that the pump delivers the flow at the pressure required by the load in the feed box, thus speeding up or slowing down as required, without stalling, and eliminating the need for a feed box sensor while nonetheless properly and uniformly filling the feed screw.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a side elevation of the feed section of an extruder in accordance with the present invention;

FIG. 2 is an end elevation of the feed section as taken substantially on the line 2—2 of FIG. 1;

FIG. 3 is a transverse section through essentially the center of the feed section as seen from the line 3—3 of FIG. 1;

FIG. 4 is a fragmentary vertical section taken through the feed section from substantially the line 4—4 of FIG. 1;

FIG. 5 is an enlarged side elevation of one of the rotary actuators of the quick release mechanism for the feed roll;

FIG. 6 is an elevation taken substantially from the line 6—6 of FIG. 5;

FIG. 7 is an enlarged side elevation of one of the locking lugs, two of which are employed with each quick release mechanism;

FIG. 8 is a view similar to FIG. 2 of another form of the present invention;

FIG. 9 is a side elevation of the embodiment of FIG. 8 taken substantially from the line 9—9 thereof.

DETAILED DESCRIPTION OF THE PREFERRED EMBODIMENTS

Figure 10:
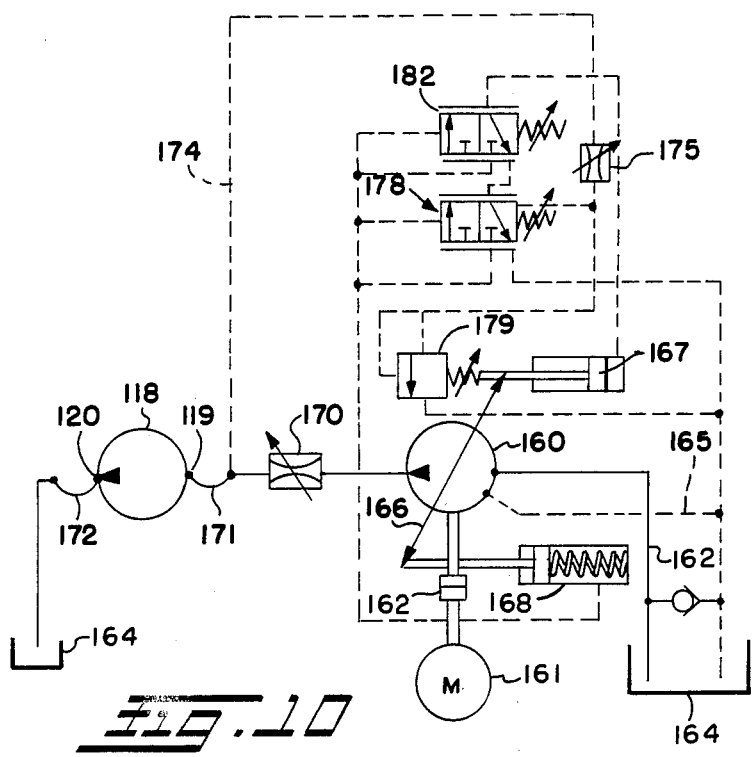
FIG. 10 is a schematic circuit diagram of the hydraulic pump and motor, and associated controls, which may be employed to drive the feed roll of the present invention.

Referring first to FIGS. 1-4 and initially to FIG. 1 there is illustrated an extruder shown generally at 10 which includes a feed section shown generally at 11 which is situated between the barrel of the extruder illustrated at 12 and housing 13 extending to the right hand side of such Figure and toward the transmission, not shown, for rotating the screw 15 which extends axially through the feed section and the barrel. Elastomeric material, usually in strip form, is fed between pinch or draw rolls and then through guide rolls 17 and 18 into guide chute 19 and then into feed box 20 seen in FIG. 3 to be fed into the feed section of the screw 15. The feed stock is then mixed or masticated under heat and pressure to form a homogeneous extrudate which then exits the die at the left hand end of the barrel to pass as a profile or other shape into curing baths or ovens, all of which is conventional in the rubber or elastomeric material extrusion art.

The feed section includes a housing shown generally at 22 which includes diametrically enlarged end or adapter portions 23 and 24 and a reduced diameter center portion 25, all of which sections surround the screw in the feed section of the extruder.

The center section 25 is provided with an angled inclined finished surface 28 illustrated more clearly in FIG. 3 which forms a plane chordally intersecting the periphery of the screw 25. Mounted on such surface is a feed box insert shown generally at 30. The feed box insert includes a wall 31 mounted on the surface 28 which includes a rectangular opening 32 accommodating the projecting portion of the screw. From such opening there is provided an inclined wall 33 and opposite end walls 34. The guide or hopper 19 is hingedly mounted on the top of wall 33 as indicated at 36.

Also as seen in FIG. 3, such end walls 34 include roll end lip seals 38 which run against the ends of feed roll 40. Such lips seals may be formed on the end walls of bronze material by a welding or brazing process and such lip seals may from time to time be reformed by a metallic spray bond process. The wall 31 of the insert immediately below the roll 40 is relieved somewhat as indicated at 42 and is provided with a roll face scraper or seal indicated at 43 which runs against the face of the feed roll, just after the surface of the feed roll passes its point of adjacency to the screw 15, but still to the right hand side of a vertical plane through the axis of the feed roll. The roll face scraper or seal 43 may be adjusted independently of the insert through adjusting screws 44, with access to such screws being provided through apertures 45 in the end wall 46 of the wall 31 of the insert.

The insert 30 is mounted on the surface 28 by fasteners 48 extending through elongated slots 49 so that the entire insert may be moved in the direction of elongation of such slots along the surface 28. Although not shown in FIG. 3, as hereinafter described, special end adjustment screws may be employed to facilitate the accurate positioning of the insert with respect to the screw and feed roll.

It will thus be seen that the feed roll 40 forms one side of a feed box 20 while the inclined wall of the adjustable insert forms the opposite side. The feed roll is of course designed to rotate in a direction opposite to that of the screw and such direction would be in FIG. 3 a clockwise direction while the screw is rotating in a counter-clockwise direction. In this manner, the adjustment of the feed box or the separately adjustable roll face scraper or seal may be employed to reduce clearances as wear occurs without disturbing the proper relationship of such seals. The maintenance of the required close clearances of the seals or scrapers with respect to the roll prevents feed stock intrusion into areas such as bearings, gears and transmission seals thus minimizing periodic maintenance or clean-out.

Referring now to FIGS. 1, 2 and 4 it will be seen that the feed roll 40 is mounted for rotation on bearing block assemblies 52 and 53 which are secured to and project inwardly from horizontal extension 54 of frame plate 55. As indicated in FIG. 1 such frame plate is of a general L-shape configuration with the blocks 52 and 53 being secured to the lower longer horizontal leg of the L through the four corner fasteners indicated at 56 in each case.

The offset and upwardly extending leg of the L-shape plate 55 has secured thereto two horizontally extending guide rods 58 and 59 by the fasteners indicated at 60. Such guide rods extend through bushings 62 and 63 in the opposite ends of parallel holes 64 in the upwardly extending projection 65 of the adapter enlargement 24 of the feed section housing 22. The ends of the horizontal extending guide rods opposite the fasteners 60 are provided with stop rings indicated at 66 in FIG. 2.

The bearing block assemblies 52 and 53 are secured to the horizontal portion 54 of the plate by the fasteners 56 with the latter extending through the corners of a stool assembly indicated at 68 for each bearing block. Each stool assembly forms an annular chamber 69 receiving rotary face cam actuator 70. Each face cam actuator 70 includes an axial shaft 72 projecting from one end thereof through the plate and to which the handles 73 and 74 are connected. Each shaft may also include a lubrication fitting as indicated at 76. The opposite end of each face cam is provided with two semi-circular face cam slots indicated at 78 and 79 in FIG. 1, each of which extends 180°, with the ends of such slots diametrically aligned.

As seen in FIG. 4, fitted within each face cam slot is a pin indicated at 80 and 81 projecting from locking lugs 82 and 83, respectively. As seen more clearly in FIG. 7, each locking lug is simply a rectangular block with the pin projecting from the inner end thereof, and the outer top surface is relieved or slightly beveled to form a wedge surface as indicated at 84. The locking lugs move through rectangular slots in the bearing blocks and engage in wedge slots 86 and 87 provided in retainers 88 and 89, such retainers in turn being secured by fasteners 90 to the flat front face 91 of the adapter sections of the feed section housing. In this manner by moving the handles 73 and 74 180° from the full line position seen in FIG. 2 to the phantom line position indicated at 93, the locking lugs will be drawn toward each other clearing the inner edges of the retainers 88 and 89 thus permitting the entire feed roll assembly to be withdrawn to the phantom line position indicated at 94, again in FIG. 2.

As seen in FIG. 4 each roll bearing block assembly 52 and 53 is provided with a lubrication fitting seen at 96 to lubricate the journal 97 supporting the reduced diameter shaft end 98 of the roll 40. Also, the bearing block assembly may be provided with a screw type adjustment mechanism 99 to obtain precise roll axis alignment. As noted, the bearing block assemblies include rounded ends 100 which seat in the rounded recesses 101 in the adapter sections of the feed section housing.

Referring again to FIGS. 1 and 2 it will be seen that the upwardly extending portion of the plate 55 is provided with a window indicated at 110 on the opposite sides of which are provided brackets 111 and 112 secured to the face of the plate by fasteners 113. Between such brackets there is journaled paired transmission sprockets 114 which are aligned with somewhat larger paired transmission sprockets 115 mounted on the end of the feed roll shaft. The paired sprockets may be interconnected by the paired drive chains 116. Mounted on the bracket 112 is hydraulic motor 118. The hydraulic motor includes fittings 119 and 120 connecting the motor through flexible lines to a stationary variable displacement pump and reservoir, all as hereinafter described. In this manner the motor may readily be moved with the feed roll from the open to the operative position, and vice versa.

While in the illustrated embodiments, the quick release mechanism is illustrated as manually operable, it will be appreciated that such mechanism may be motor driven by a suitable rotary actuator. Also, while the feed roll is shown as manually movable to and from its operable or open position, it will also be appreciated that such movement may be obtained by a linear actuator such as a double acting piston-cylinder assembly.

Referring now to FIGS. 8 and 9 there is illustrated another embodiment of the present invention. In this embodiment, the guide rods are on the bottom rather than on the top, but it will be understood such rods may be on the top or bottom. The feed box is formed on the feed section housing 129 on one side by the power driven feed roll 40 and on the opposite side by the inclined wall 132 of insert 133. The insert includes end walls 134 on which are mounted the feed roll lip seals 135. The insert also includes the separately adjustable face seal or scraper 43 which may again be adjusted independently through screws 44 accessible through the end wall 46. Again, the insert is mounted on an inclined wall 138 of the housing 129 and may be clamped in place by fasteners 48 extending through elongated slots. In this embodiment, adjustment of the insert may also be obtained through adjusting screws 139 extending through the wall projection 140 of the housing.

Such housing also includes projections 142 and 143 extending therebeneath which include sliding journals 144 and 145 in which parallel guide rods 147 and 148 are mounted for linear movement. Such guide rods are secured as indicated at 149 and 150 to the lower edge of plate 153.

Such plate may have the profile configuration shown more clearly in FIG. 9 and on such plate are mounted the bearing blocks 52 and 53 for the feed roll 40. The plate 153 mounts the bearing blocks thereon through the quick release mechanism illustrated generally at 154 which may be the same as shown in FIG. 4 with the handles 73 and 74 either locking the bearing blocks to the retainers 88 and 89 or releasing the same so that the entire plate including the feed roll may be moved to the left as seen in FIG. 8 for cleaning the feed box 20. With the guide rods beneath the feed section of the extruder, easier access to the feed box is obtainable. Again, a hydraulic motor 118 may be mounted on the plate 153 to drive the feed roll 40 through a suitable transmission illustrated at 156.

Although not illustrated, it will be appreciated that a suitable safety tip will be provided shutting the extruder down as soon as the feed roll is unlocked.

Referring now to FIG. 10 there is illustrated a variable displacement unidirectional pump indicated at 160 which is driven by electric motor 161 through coupling 162. The motor 161 may be the screw drive so the feed roll RPM will vary with the screw RPM. The intake line of the pump seen at 163 is connected to the tank 164 and the pump includes a drain line 165. The swash plate 166 of the pump is controlled by a control piston 167 and a return piston 168. The outlet of the pump passes through an adjustable flow control valve seen at 170 and then through flexible line 171 to the fitting 119 of the motor 118. From the motor the fluid passes through the fitting 120, through flexible line 172 and back to tank 164.

Between the motor and the adjustable flow control valve 170 there is provided a feed back line 174 which passes through an adjustable flow control valve 175. From the valve 175 the feed back line passes to feed back flow control valve 178, and also to variable relief valve 179. The return piston 168 includes a pilot line connected both the valve 178 and also to valve 182 with the latter including a line connected to the control piston 167. Both of the valves 182 and 178 are three-position valves which are infinitely variable. The valve 182 provides pressure control while the valve 178 which is feed back controlled provides flow control. The system also permits the use of a smaller prime mover, resulting in energy savings. The control system thus automatically regulates the pump displacement to deliver the flow required. Accordingly, when there is no system demand, the pump is at negligible flow to maintain pressure only. When the system demands flow, the pump delivers only the flow required by the system and at the pressure required to move the load. Such variable displacement pumps and the noted control systems are commercially available, for example, from REXROTH, Industrial Hydraulics Division of Bethlehem, Pennsylvania. In any event the hydraulic pump and motor unit readily permits the movement of the feed roll in accordance with this invention and also delivers only the torque required minimizing the possiblity of starving, regurgitation or strip breakage, resulting in more uniform production, reduced operator attention, maintenance and down time. All of this is accomplished without a feed box sensor since it is only the load on the feed roll or the moving wall of the feed box which controls the torque of the roll drive.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. An extruder for rubber materials and the like comprising: an extruder screw; a feed box for said screw operative to receive feed stock for the extruder, one side of said feed box being formed by a feed roll; and means mounting said feed roll for linear sliding movement toward and away from said screw and said feed box to permit cleaning of the roll and feed box.

2. An extruder as set forth in claim 1 wherein said feed roll is mounted on bearing blocks which are in turn mounted on a frame, and guide means supporting said frame and thus said roll for movement toward and away from the feed box.

3. An extruder as set forth in claim 2 wherein said guide means comprises parallel guide rods.

4. An extruder as set forth in claim 3 wherein said guide rods are mounted on said frame and journaled for sliding movement with respect to the extruder.

5. An extruder as set forth in claim 4 wherein said guide rods extend above the screw of the extruder and are offset from the feed box.

6. An extruder as set forth in claim 4 wherein said guide rods extend below the screw of the extruder.

7. An extruder as set forth in claim 1 including quick release means for locking said roll in operative position and releasing said roll from such operative position.

8. An extruder as set forth in claim 2 including power means to rotate said feed roll mounted on said frame.

9. An extruder as set forth in claim 8 wherein said power means comprises a hydraulic motor driven by a load responsive variable displacement pump which is responsive to the load on the feed roll.

10. An extruder as set forth in claim 1 including an adjustable insert for said feed box, said insert including separately adjustable lip and face seals for said feed roll.

11. An extruder as set forth in claim 1 wherein said feed box includes an inclined wall member, said feed roll rotating adjacent to and counter the rotation of the screw, and a scraper running against the feed roll just after its surface passes its point of adjacency to the screw, both said scraper and said wall member being mounted for positional adjustment toward the roll and screw, respectively.

12. An extruder as set forth in claim 11 wherein said wall member and said scraper are mounted for said positional adjustment on a common surface.

13. An extruder as set forth in claim 12 wherein said common surface extends at an inclined angle with respect to a vertical plane through the axis of the screw.

14. An extruder as set forth in claim 13 wherein said scraper runs against said feed roll on an underside of said feed roll on the side of a vertical diametral plane therethrough toward the vertical plane of the screw, thus permitting the feed roll to be moved horizontally toward and away from the screw and said wall member.

15. An extruder as set forth in claim 1 including a motor driving said feel roll, and means responsive to the load on said feed roll to change the driving torque of said motor.

16. An extruder as set forth in claim 15 wherein said means responsive to the load comprises a variable displacement hydraulic pump driving said roll through a hydraulic motor, and driving pressure feed back means operative to control the displacement of the pump.

17. An extruder as set forth in claim 1 including a power means to drive said feed roll in a rotational direction opposite that of the screw, and feed roll load responsive means operative to control the torque generated by said power means.

18. An extruder as set forth in claim 17 including a hydraulic motor driving said feed roll, and a variable displacement pump driving said motor.

19. An extruder as set forth in claim 18 including means responsive to the load on said roll to control the displacement of the pump.

20. An extruder for rubber materials and the like comprising: an extruder screw; a feed box for said screw operative to receive feed stock for the extruder, one side of said feed box being formed by a power driven feed roll which is positioned essentially tangentially adjacent the screw at said feed box; power means to drive said feed roll in a rotational direction opposite that of the screw; and quick release lock means operative to release said roll for linear movement away from said screw and feed box, and means comprising means mounting said feed roll for such linear movement.

21. An extruder for rubber and like materials comprising a feed box, a feed roll supported in bearing blocks comprising a part of said feed box, and a quick release mechanism for said feed roll including linearly movable locking lugs mounted on said bearing blocks and engaging said feed box when locked, and cam actuator means for said locking lugs operative to extend and withdraw said lugs, whereby when said lugs are withdrawn said roll may be moved to an open position.

22. An extruder for rubber material and the like, comprising: an extruder screw; a feed box for said screw operative to receive feed stock for the extruder, one side of said feed box being formed by a feed roll; means mounting said feed roll for sliding movement toward and away from said screw and said feed box to permit cleaning of the roll and feed box; and quick release means for locking said roll in operative position and releasing said roll from such operative position, wherein said quick release means comprises a rotary actuator and a locking lug driven by the rotary actuator.

23. An extruder for rubber materials and the like, comprising: an extruder screw; a feed box for said screw operative to receive feed stock for the extruder, one side of said feed box being formed by a power driven feed roll which is positioned essentially tangentially adjacent the screw at said feed box; power means to drive said feed roll in a rotational direction opposite that of the screw; and quick release lock means operative to release said roll for movement away from said screw and feed box, wherein said quick release lock means comprises a frame supporting said roll for rotation and for said movement and locking lugs movable from a locking position locking the frame against movement with respect to the extruder to a release position permitting said movement.

24. An extruder as set forth in claim 23 including an actuator for said lugs.

25. An extruder as set forth in claim 24 wherein said locking lugs are mounted for extension to said locking position and retraction to the release position, and include a wedge surface cooperating with a wedge slot in said locking position.

26. An extruder as set forth in claim 25 wherein said lugs are mounted on said frame and said wedge slots are mounted on the extruder.

27. An extruder as set forth in claim 26 wherein said actuator is a rotary actuator and includes a face cam driving said lugs for movement.

28. An extruder as set forth in claim 27 wherein said face cam includes two semi-circular slots, and a lug driven from each slot through a follower pin extending from the respective lug.

29. An extruder for rubber materials and the like, comprising: a screw; a feed box for said screw, said feed box being formed on one side by a feed roll and on the opposite side by an inclined wall member which includes two end walls with circular lips for engaging the feed roll, said feed roll located adjacent to said screw and rotating counter to the rotation of the screw; and a scraper running against the feed roll just after its surface passes its point of adjacency to the screw, both said scraper and said inclined wall member being mounted for positional adjustment toward the roll and the screw, respectively.

30. An extruder for rubber materials and the like, comprising: a feed box; a feed roll supported in bearing blocks comprising a part of said feed box; and a quick release mechanism for said feed roll including linearly movable locking lugs, and cam actuator means for said locking lugs operative to extend and withdraw said lugs, whereby when said lugs are withdrawn said roll may be moved to an open position and wherein said cam actuator is a rotary face cam including two cam slots, a lug driven by each cam slot.

31. An extruder as set forth in claim 30 wherein each lug includes a tapered surface, and a wedge slot into which said lug is driven to lock the roll in place.

* * * * *